*J. E. Rice,*
*Picture Frame,*
Nº 54,208. Patented Apr. 24, 1866.
Fig. 1.
Fig. 2.
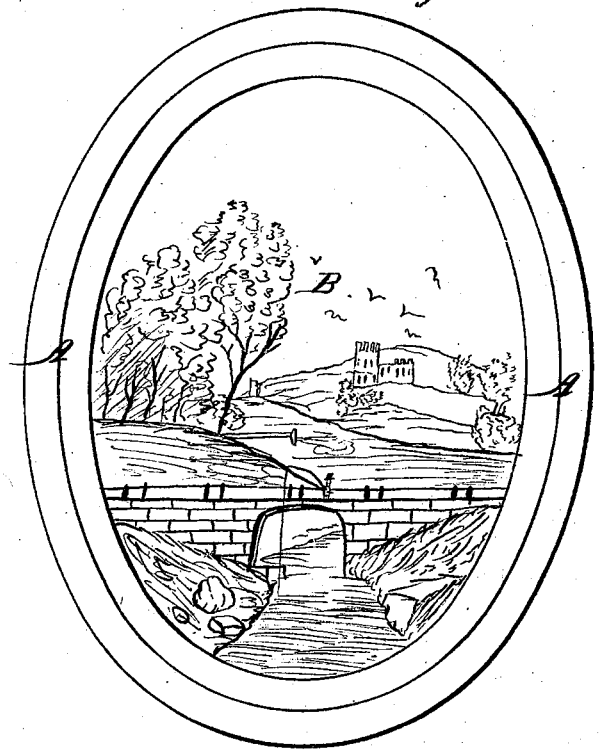
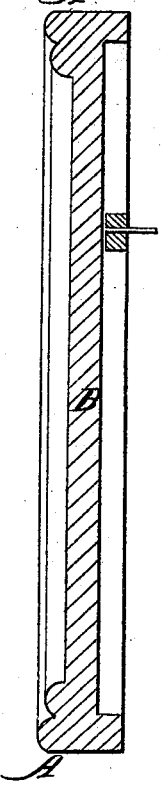
Witnesses
R. T. Campbell
E. Schafer
Inventor
J. E. Rice
by his Attys
Mason Fenwick Lawrence

UNITED STATES PATENT OFFICE.

J. E. RICE, OF BOSTON, MASSACHUSETTS.

IMPROVEMENT IN PICTURE-FRAMES.

Specification forming part of Letters Patent No. 54,208, dated April 24, 1866.

*To all whom it may concern:*

Be it known that I, J. E. RICE, of Boston, Suffolk county, State of Massachusetts, have invented a new and useful Picture-Frame; and I do hereby declare that the following is a full, clear, and exact description thereof, reference being had to the accompanying drawings, making a part of this specification, in which—

Figure 1 is a front view of my picture-frame. Fig. 2 is a vertical cross-section through the same.

Similar letters of reference indicate corresponding parts in both figures.

The object of this invention is to construct a picture-frame, and also the plate upon which the picture is to be painted, of one piece of glass of any desirable color or combination of colors, thus affording a very cheap and beautiful frame which will greatly add to the effect of the picture, and which can be made in a suitable mold at one operation of casting, as will be hereinafter described.

In order to construct the frames and service-plates so that these parts will be of one homogeneous piece, suitable molds are made, according to the size or design which is required, and the melted glass is poured into these molds. When cool the frames are removed and the pictures painted upon the service-plates.

The molds which are used to cast the frames in may be made in any of the ways well known in the art of making molds for glass castings, and these molds may be so constructed that the frames A produced in them will project beyond the surface of the plate B in the form of a bead or molding, as represented in the drawings.

The surface B, upon which the picture is painted, may be made flat, concave, or convex, and in casting the frames care should be observed to have the surfaces B perfectly smooth and free from holes.

The service-plate B may be made much thinner than the frame which surrounds it, as shown in Fig. 2, in which case the back edges of the frame will project from the back surface of the plate B in order to give the proper thickness to this frame.

By constructing the frame and service-plate of one piece of glass I not only make a very cheap article, but I avoid the necessity of employing cement or other means for securing these plates to the frames, and can produce the article complete at one operation of casting. Besides this, the frame and service-plate, being made of semi-transparent glass, or, if preferred, of glass having its surface ground off, will permit the light to be transmitted from the rear of the picture-frame toward a person viewing the picture when the same is hung against the wall with its top portion projecting forward therefrom, as in the ordinary way of hanging pictures, such transmitted light greatly enhancing the artistic effect and beauty of the object painted upon the service-plate.

Having thus described my invention, what I claim, and desire to secure by Letters Patent, is—

A picture-frame and service-plate made of one piece of glass, as a new and improved article of manufacture, substantially as described.

J. E. RICE.

Witnesses:
CHAS. S. LINCOLN,
SETH KNOWLES.